July 29, 1958 — L. D. SANDERS — 2,845,189
AUTOMOBILE PARKING APPARATUS
Filed Jan. 18, 1957 — 6 Sheets-Sheet 1

INVENTOR
Leon D. Sanders
ATTORNEYS

July 29, 1958 L. D. SANDERS 2,845,189
AUTOMOBILE PARKING APPARATUS
Filed Jan. 18, 1957 6 Sheets-Sheet 2

INVENTOR
Leon D. Sanders
BY
ATTORNEYS

July 29, 1958 L. D. SANDERS 2,845,189
AUTOMOBILE PARKING APPARATUS
Filed Jan. 18, 1957 6 Sheets-Sheet 3

INVENTOR
Leon D. Sanders
BY
ATTORNEYS

July 29, 1958

L. D. SANDERS 2,845,189

AUTOMOBILE PARKING APPARATUS

Filed Jan. 18, 1957

INVENTOR
Leon D. Sanders

BY
Morgan Finnegan Durham Pine.
ATTORNEYS.

July 29, 1958  L. D. SANDERS  2,845,189
AUTOMOBILE PARKING APPARATUS
Filed Jan. 18, 1957  6 Sheets-Sheet 6

INVENTOR
Leon D. Sanders
BY
ATTORNEYS.

United States Patent Office 2,845,189
Patented July 29, 1958

2,845,189

AUTOMOBILE PARKING APPARATUS

Leon Donald Sanders, York, Pa., assignor to Systematic Parking Company, York, Pa., a body corporate Application January 18, 1957, Serial No. 635,050

8 Claims. (Cl. 214—16.1)

This invention relates generally to apparatus for mechanically handling material, such as automobiles, for storage purposes to transfer automobiles to and from an elevator and the stalls of a building.

In order to make maximum use of a given amount of ground area for storage purposes, such as the storing or parking of automobiles, it is highly practicable to provide a multistorage building structure having vertically spaced floors or tiers and to employ an elevator to raise or lower the vehicles to and from the level of the floors with mechanical transfer mechanism being provided on the elevator to transfer the vehicles to and from the elevator. The present invention is directed to and concerned with such a parking facility of an improved construction.

It is an object of this invention to provide an improved parking or material storage facility wherein an elevator is employed to raise and lower vehicles to and from vertically arranged storage stalls in a multistory building structure and wherein the vehicles are transferred to and from the elevator on each side thereof by mechanical transfer apparatus. Another object of the invention is to provide, with such a parking facility, a transfer apparatus which permits the elevator to be no wider than absolutely necessary to accommodate the normal size car lengthwise thereacross and yet with this minimum dimension to most expediently and efficiently mechanically transfer vehicles to and from the elevator on each side thereof to a maximum distance such that two cars may be stored in tandem on each side of the elevator. Still another object of the invention is to provide, in such a parking facility, an elevator having this transfer apparatus for mechanically transferring vehicles to and from opposite sides thereof mounted thereon as part of the elevator and wherein this transfer apparatus is constructed and arranged so that the stresses or reactive forces developed in the apparatus incident to the transfer of a vehicle to or from the elevator are kept at a minimum. Another object of the invention is to provide in a parking facility, such an elevator transfer apparatus that includes a transversely movable dolly for transferring vehicles to and from the elevator and which is power driven, through a power driven extension slide, in such a manner that the acceleration and velocity of the dolly is maintained relatively low with the length of the dolly being required only to be sufficient to accommodate the under carriage of a vehicle and still with the slide being extendable from each side of the elevator sufficiently to store two cars in tandem in the stalls. Another object of the invention is to provide, in each storage facility, an elevator and transfer apparatus which, although relatively simple in construction, is highly reliable in operation and provides efficient and easy handling of vehicles and which provdies for maximum use of available storage space.

In accordance with the present invention there is provided a multistory building structure which has two banks of storage stalls horizontally spaced a distance slightly greater than the length of a standard passenger car with the stalls in each bank being vertically spaced and of a depth sufficient to receive two vehicles in tandem. Between these banks of stalls there is provided an elevator for raising or lowering these vehicles to or from any desired stall with the vehicles being moved from the elevator to a desired stall and from such stall to the elevator through a transfer device which is mounted on and forms a part of the elevator.

This transfer device includes a dolly which is movable laterally of the elevator to and from the stalls on each side of the elevator and which includes a hydraulically operated jack frame for raising the cars and supporting them on the dolly. The dolly is substantially shorter than the width of the elevator being of a minimum length sufficient to engage the under carriage of a vehicle throughout its length and is moved laterally of the elevator by means of an extension slide which is positioned beneath the dolly and slidably carried thereby. This extension slide extends almost the entire distance across the elevator being substantially larger than the dolly and is moved laterally of the elevator by means of a suitable cable drive mechanism to extreme positions where it extends substantially its entire length from either side of the elevator into a storage stall. This movement of the extension slide causes the dolly to also move laterally of the elevator and for this purpose cables are connected to the ends of the dolly and are trained over pulleys mounted on opposite ends of the slide and further over pulleys mounted on the elevator at the sides that are respectively remote from these opposite ends. These cables are wound in opposite rotative directions about a suitable drum means and this drum means is driven through the drive mechanism that operates the extension slide in a manner so that the cable that is effective to move the dolly is lengthened during the movement of the dolly resulting in decreasing the velocity and extent of the dolly movement with this reduction being such that as the extension slide is moved to and from its extended position the dolly is moved relative to the extension slide a distance equal to the distance between the connection of the cable that is effecting this movement and the pulley on the extension slide over which this cable is trained with this distance necessarily being substantially less than that of the movement of the extension slide since the dolly is substantially shorter than the extension slide. Thus, as the extension slide moves a predetermined distance into a storage stall the dolly is extended from the extension slide into the stall with the movement of the dolly relative to the extension slide being less than the lateral movement of the extension slide.

With this transfer device the dolly may be extended a sufficient distance into the stalls on either side of the elevator to store two cars in tandem in these stalls from the elevator with the acceleration and velocity of the dolly being maintained at a minimum for a given velocity of the extension slide thereby insuring low stresses in the driving cables and other apparatus and trouble free operation.

It will be understood that the foregoing general description and the following detailed description as well are exemplary and explanatory of the invention but are not restrictive thereof.

The accompanying drawings, referred to herein and constituting a part hereof, illustrate one embodiment of the invention and together with the description, serve to explain the principles of the invention.

Figure 1:
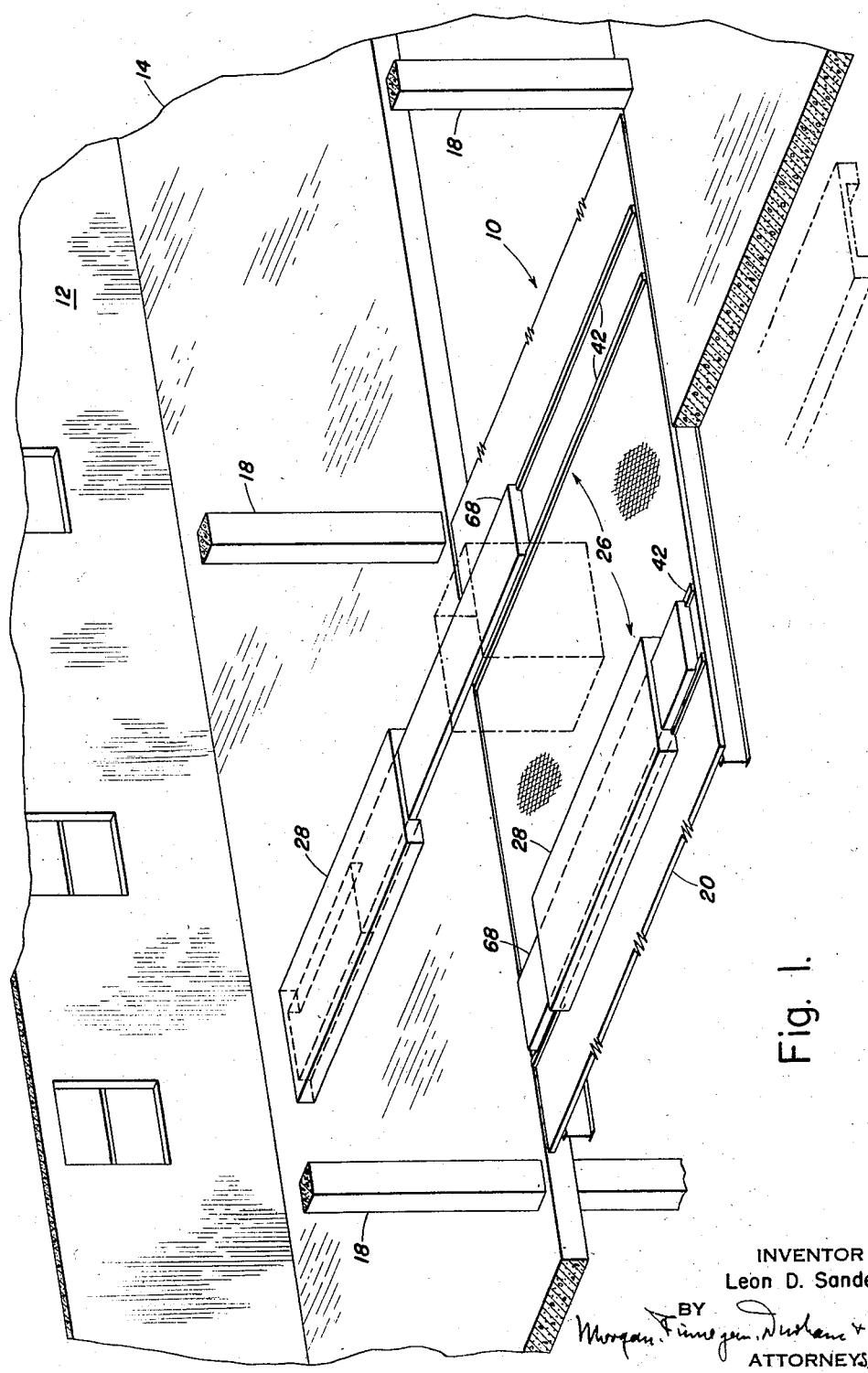
Figure 1 is a fragmentary perspective view of a multistorage building structure having two horizontally spaced banks of vertically spaced storage stalls or tiers between which is located the elevator, with only one floor or pair of stalls of the building being shown in this view.

Referring now in detail to the drawings, the illustrative and preferred embodiment of the invention depicted therein includes an elevator generally designated 10 which is positioned between two banks of stalls or storage floors in the multistorage building structure 12 with one stall in each bank being shown in Figure 1 and identified as 14 and 16, respectively, and with each bank including a multiplicity of vertically spaced stalls. The distance between the horizontally spaced banks of stalls and accordingly the width of the elevator positioned between the stalls is only sufficiently great to accommodate a standard passenger automobile lengthwise, with a distance of 23 feet for example being acceptable, so that the automobile may be moved onto the elevator from the ground floor and raised to a desired floor or stall and then transferred from the elevator to the stall with this process being reversed when removing a vehicle from storage. The elevator 10 is positioned between and supported from the upright columns 18 which are stationary and form part of the structure of building 12 and as shown the elevator is comprised of the elongated platform 20 which extends throughout the length of the stalls and which carries the mechanical transfer mechanism.

Figure 7:
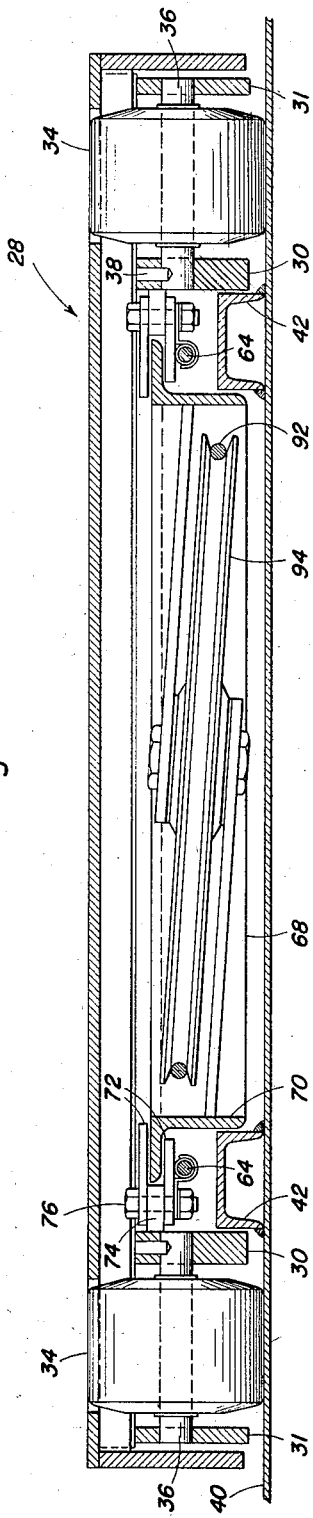
Figure 7 is a sectional view of the dolly and extension slide as mounted on the floor of the elevator and is taken generally along line 7—7 of Figure 3.

Vehicles are transferred to and from either side of platform 20 of the elevator from and to the respective stalls 14 and 16 by transfer apparatus 26 with there being two such apparatuses shown in Figure 1. This transfer mechanism includes dolly 28 positioned crosswise of platform 20 and adapted to support a vehicle to transfer it to or from the elevator. The dolly is comprised of a rigid frame which includes elongated structural members 30 and 31 (Figure 7) extending along each side of the dolly. Intermediate these members are mounted numerous rollers 34 each of which is journaled upon a shaft 36 which is received within suitable bores in these elongated structural members and is retained in place in any desired manner such as by set screws 38. These rollers engage the floor 40 of the elevator or in other words the surface of platform 20 and provide for easy movement of the dolly across the elevator and into the stalls on either side thereof. The dolly is guided in its movement by the channels 42 welded to and extending across floor 40 and positioned immediately inward of structural members 30 of the dolly frame.

Figure 2:
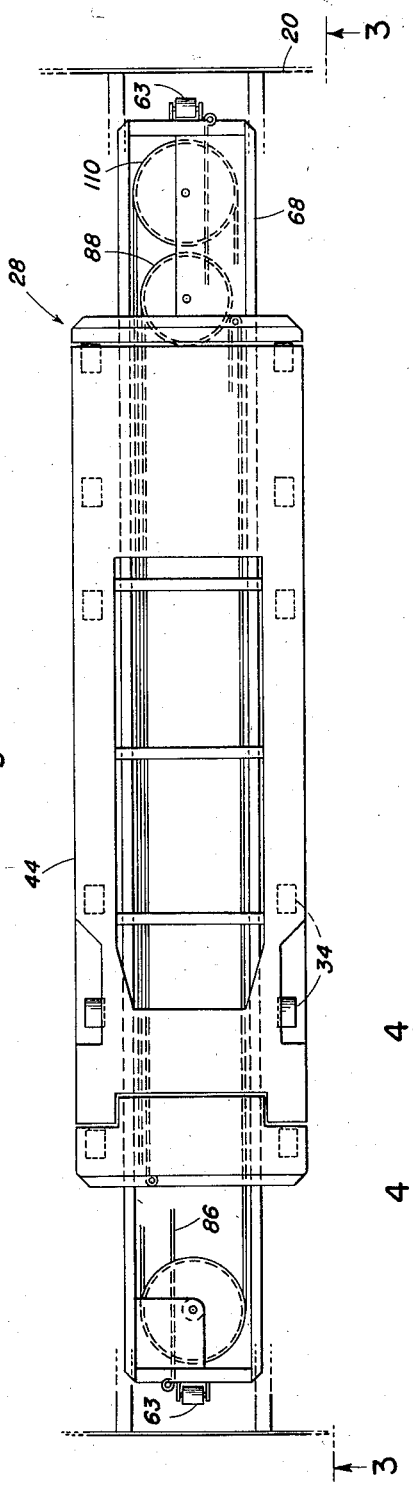
Figure 2 is a plan view of one of the dollys that is mounted on the elevator and the extension slide located immediately beneath the dolly and employed to move the dolly laterally of the elevator into the storage stalls.
Figure 4:
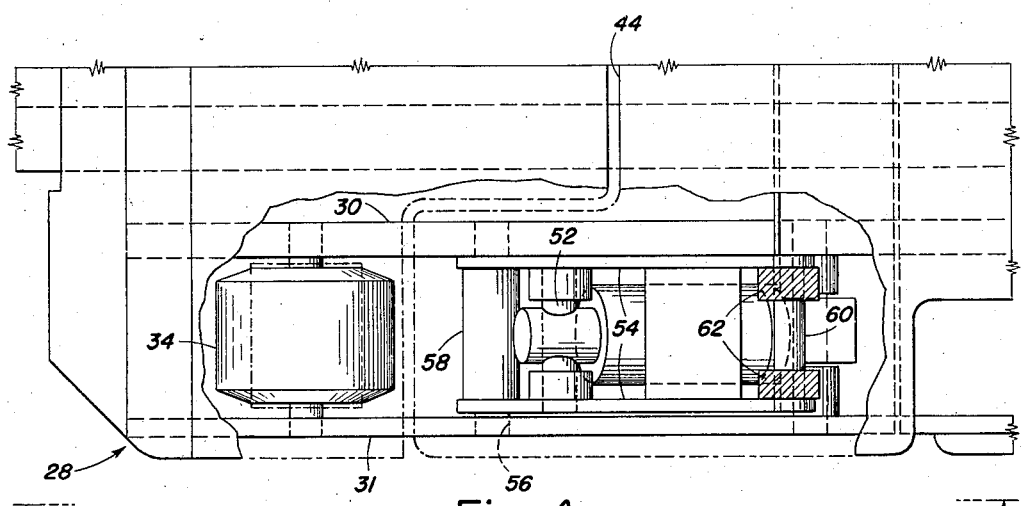
Figure 4 is a fragmentary plan view of one corner of the dolly partially broken away to show the detailed construction of the dolly's rollers or wheels and the fluid pressure operated jacking mechanism.
Figure 5:
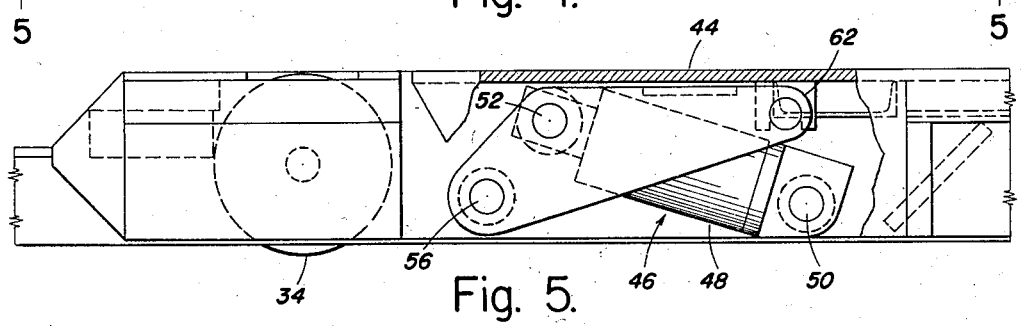
Figure 5 is a side view of the portion of the dolly shown in Figure 4, taken generally from line 5—5 of Figure 4 and also being partially broken away to show the detailed construction of the fluid pressure operated jacking mechanism.
Figure 6:
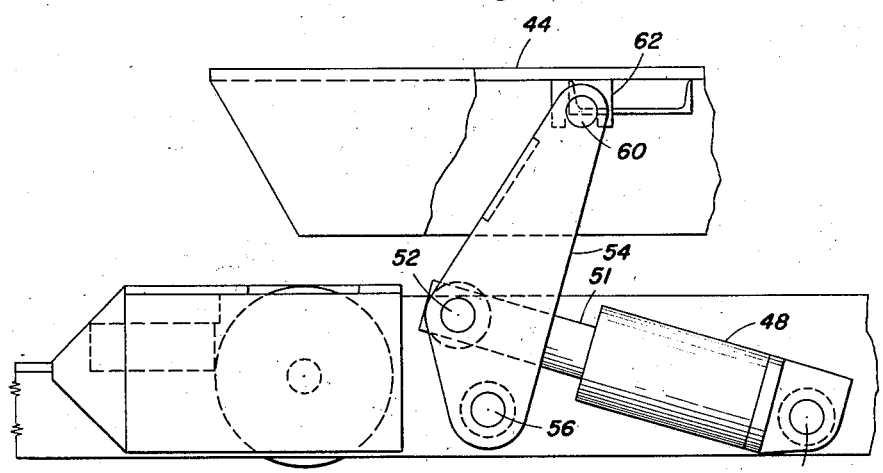
Figure 6 is a view similar to that of Figure 5 but showing the jacking mechanism in its elevated position.
Figure 8:
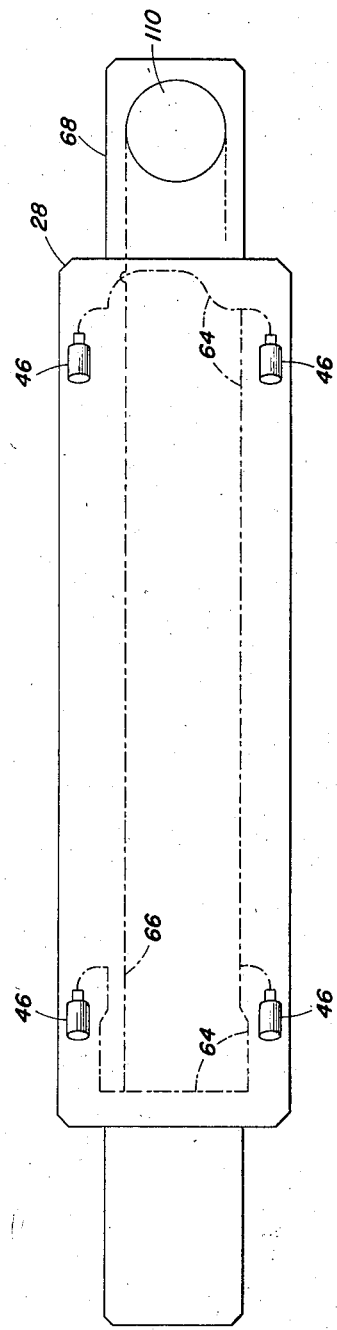
Figure 8 is a diagrammatic view of the dolly and extension slide showing the location of the four fluid pressure operating jacking devices with the fluid pressure supply conduits for these jacking devices being indicated in dotted lines.

In order to support the vehicle upon the dolly the dolly is provided with jack frame 44 which extends substantially the full length of the dolly, as best shown in Figure 2, and which may be raised relative to the dolly frame through the action of fluid pressure operated jacking mechanisms 46, one of which is shown in detail in Figures 4, 5 and 6. There are four identical jacking mechanisms 46, one being provided at each corner of the jack frame, as indicated in Figure 8, and each of these mechanisms includes a fluid pressure operated jack 48 positioned between members 30 and 31 and pivotally mounted at one end to shaft 50 extending between and supported by these members. The other end of the jack or, as shown, the piston rod 51 extending from the jack is pivotally mounted to shaft 52 secured to and extending between the spaced levers 54. These levers are pivotally mounted upon shaft 56 which extends between and is supported by elongated frame members 30 and 31 with spacer sleeve 58 being positioned over this shaft and maintaining the levers in spaced relation. Secured to and extending between the other end of these levers is rod 60 which is received within the downwardly facing recesses in the spaced brackets 62 that are secured to the underside of the jack frame. Through this arrangement both the jack 48 and the spaced levers 54 occupy a generally horizontal position when the jack frame is in its lowered position as shown in Figure 5 so that the jacking apparatus does not occupy any substantial vertical distance and in fact is accommodated within the height required by the rollers 34 of the dolly. In raising the jack frame, jack 48 pivots the separated levers 54 about shaft 56 to where the levers are substantially vertical thereby raising jack frame 44 as shown in Figure 6 to where it would engage the undercarriage of a vehicle and thereby support the vehicle from the dolly. The fluid pressure operated jacks 48 are supplied with fluid pressure or a motivating fluid through a suitable supply manifold which includes conduits 64 mounted upon the frame of the dolly and supplied through the flexible supply conduit 66.

Figure 3:
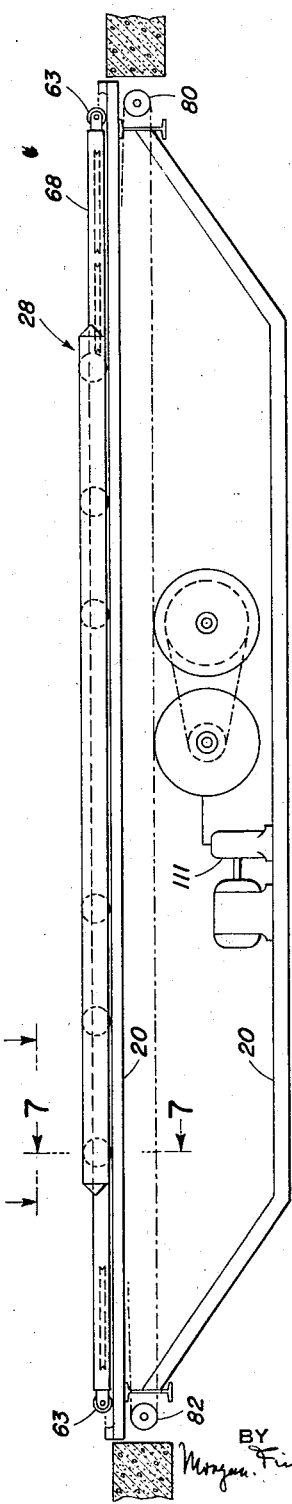
Figure 3 is a side view of the elevator showing the dolly and extension slide mounted on the elevator floor and the driving drums and idler pulleys mounted on the elevator below the floor thereof.

The dolly is, as shown in Figures 2 and 3, substantially shorter than the width of the elevator and is only of a sufficient length to accommodate the undercarriage of a vehicle with a length of 17 feet being satisfactory for this purpose. However, notwithstanding this relatively short length of the dolly it is moved from the elevator to the stalls on either side a distance sufficient that two cars may be stored in tandem in these stalls and to achieve this, lateral movement of the dolly is effected through the action of extension slide 68 mounted beneath and slidably carried by the dolly with the extension slide being provided at each of its sides with an angle bar 70 the horizontal leg of which is received between spaced brackets 72 spaced on either side of support bracket 74 which extends laterally from frame member 30 with the brackets 72 being retained in place by bolt 76. The extension slide is substantially longer than the dolly, preferably being slightly shorter than the width of the elevator and extends an equal distance from each end of the dolly when the dolly is in its normal position midway between the sides of the elevator with the dolly and extension slide being in their normal position, i. e. not in an extended position from either side of the elevator, in Figures 2, 3, 8 and 9.

Longitudinal movement of extension slide 68 to and from extreme positions where it extends substantially its full length from either side of elevator 10 onto the floors of the stalls is effected through a cable drive mechanism that includes cables 76 and 78 (Figures 9, 10 and 11) which are respectively secured to opposite ends of the slide and are respectively passed over sheaves 80 and 82 journalled to the elevator immediately adjacent its respective sides with the cables then being wound in opposite rotative directions about drum 84. By rotating drum 84 clockwise, as viewed in Figures 8, 9 and 10, extension slide 68 will move to the left with cable 78 being wound on drum 84 while cable 76 is unwound from or played off of the drum at an equal rate with rotation of this drum in the clockwise direction having the opposite effect. The sheaves 80 and 82 are positioned as close to the edge of the elevator as practicable in order that maximum longitudinal movement of the extension slide may be had. The distance between the end of extension slide 68 to which the cables 76 and 78 are attached and the axis of the respective sheaves 80 and 82 over which these cables are trained when the slide is in its centered position on the elevator is the distance that the slide may be moved laterally of the elevator in each direction by the cable drive with this distance being designated A in Figure 9. As the slide is extended off the elevator into the oppositely disposed stalls one of the rollers 83, mounted on opposite ends of the slide, engage the floor of the stall and roll therealong providing easy movement of the slide.

In lieu of employing two separate cables 76 and 78 a single continuous cable may be used having its center portion wound about drum 84 and connected at its ends to opposite ends of extension slide 68.

The movement of extension slide 68 is operative to move dolly 28 crosswise of the elevator into the stalls on opposite sides thereof through the medium of another cable drive organization. This organization includes cable 86 connected to the left end of the dolly as viewed in Figures 9, 10 and 11 and successively passed over sheave 88 mounted on extension slide 68 at the opposite or right end of the slide and over sheave 90 mounted on the left side of the elevator and preferably in coaxial relation with sheave 82. Connected to the other or right end of dolly 28 is cable 92 which is passed over sheave 94 mounted on the left end of slide 68 and over sheave 96 mounted adjacent the right side of the elevator and preferable in coaxial relation with sheave 80. These cables 86 and 92 are wound about drum 98 in opposite directions so that as this drum is rotated in a clockwise direction cable 86 will be wound on and cable 92 will be unwound from this drum at the same rate with the opposite or counterclockwise rotation of the drum having an opposite effect.

When extension slide 68 is moved to the right by winding cable 78 on drum 84, dolly 28 is also moved to the right by means of cable 86 because the sheave 88 over which this cable is trained is mounted upon and moved with extension slide 68. If cable 86 were anchored to the elevator, i. e. if drum 98 remains stationary, dolly 28 would move at twice the speed of extension slide 68 and would move relative to this extension slide the same distance that the extension slide moves relative to the elevator. However, the maximum distance that dolly 28 may move relative to extension slide 68 in either direction from a position where the dolly is centered with respect to the slide (Figure 9) is the distance from the end of the dolly to the axis of the sheave on the extension slide over which the cable connected to the respective end of the dolly is trained with this distance being designated or indicated as B in Figure 9. Since the distance B or the maximum movement of the dolly relative to the extension slide is substantially less than the distance A or the maximum movement of the extension slide relative to the elevator it is necessary that the drive cables 86 and 92 be respectively unwound from drum 98 when they are effective to move the dolly in response to the movement of the extension slide and with the rate at which they are unwound being such that as extension slide 68 moves through distance A dolly 28 will move relative to the extension slide through the distance B. This is accomplished by interconnected drums 84 and 98 through a suitable drive mechanism such as belt 100 which passes over pulleys 102 and 104 mounted on and secured to the shafts of drums 84 and 98 respectively. The relative diameters of pulleys 102 and 104 is such that as drum 84 is rotated to wind cable 76 or 78 thereon and move extension slide 68 to the right or left through the distance A to its extreme position where it extends substantially its full length from the elevator drum 98 will be rotated to respectively unwind cable 86 or 92 at a rate so that as extension slide 68 moves through its distance A dolly 28 will move relative to the extension slide and in the same direction as the extension slide through the distance B.

Figure 9:
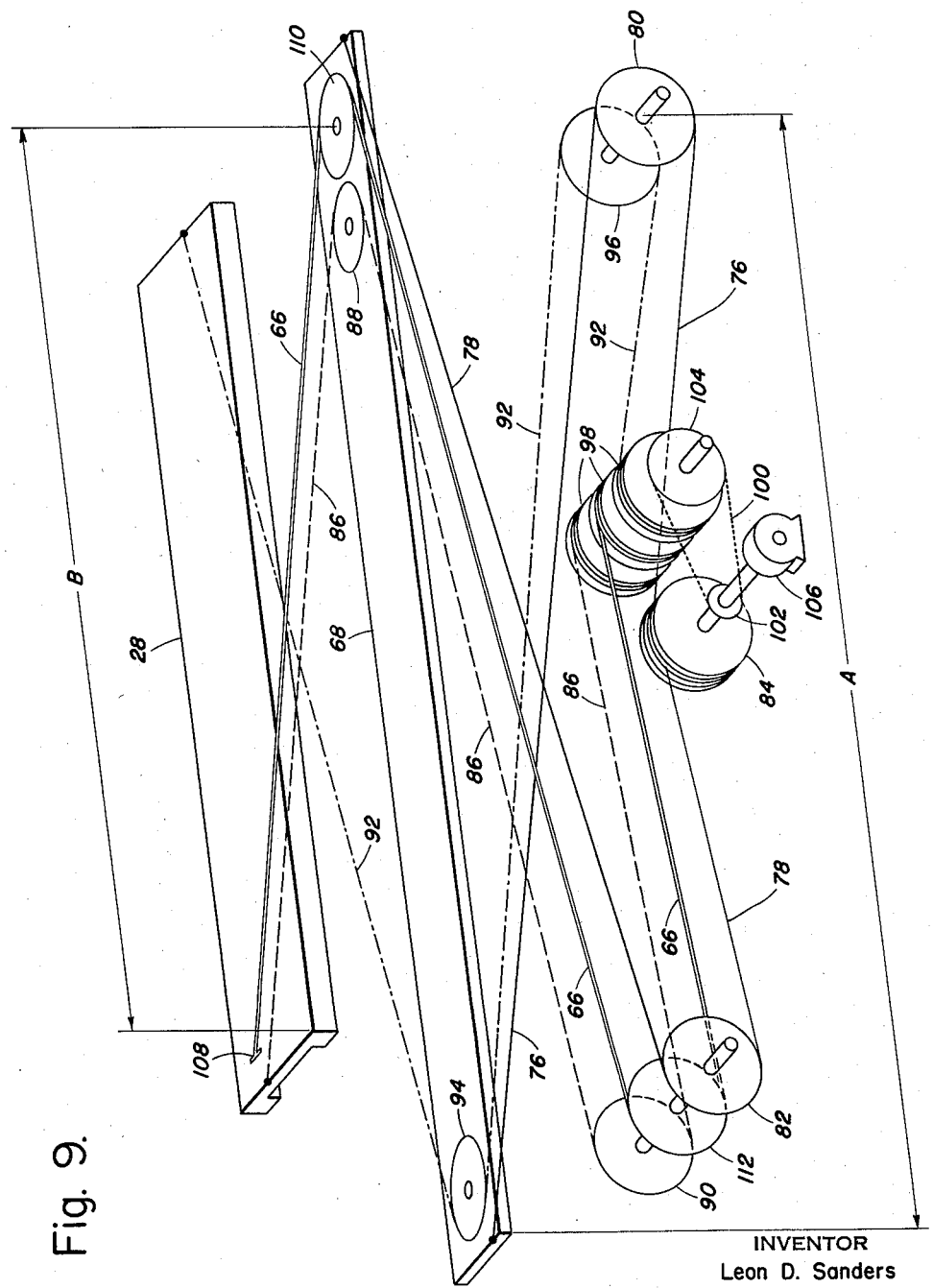
Figure 9 is an exploded diagrammatic perspective view of the dolly and extension slide together with the cable drive mechanism therefore and the flexible hose for supplying fluid pressure to the jacking device on the dolly.
Figure 10:
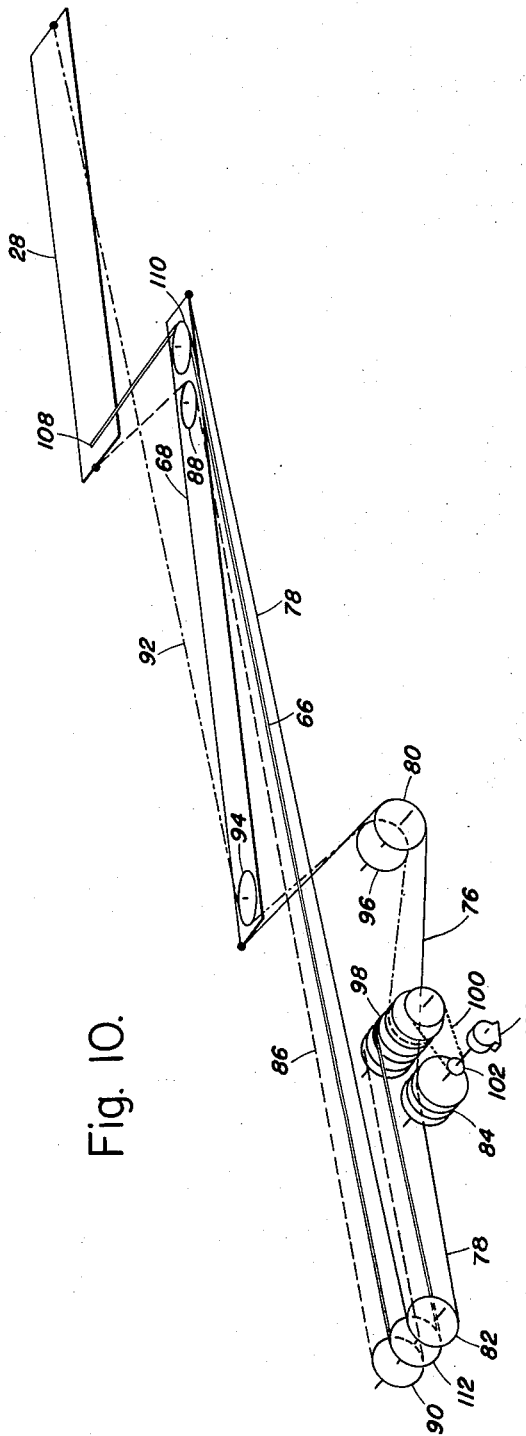
Figure 10 is a view similar to that of Figure 9 at a small scale but showing the dolly and extension slide in their extended position to the right.
Figure 11:
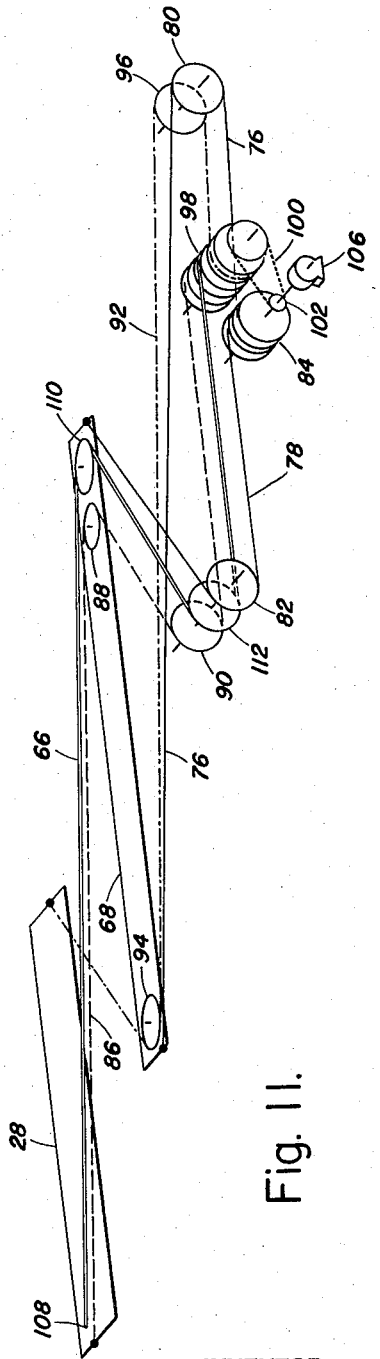
Figure 11 is a view similar to that of Figure 10 but showing the dolly and extension slide extended in the opposite direction.

Figures 10 and 11 show the dolly and extension slide in their right and left extended positions respectively with extension slide 68 having been moved from its central position shown in Figure 9 through the distance A and the dolly having been moved from its central position with respect to the extension slide through the distance B.

With this extension slide and dolly arrangement the dolly may be moved laterally of the elevator into the stalls on either side thereof a maximum distance such that two cars may be stored in tandem in the stalls from the elevator and with the acceleration and size of the dolly being maintained at a minimum and at the same time with the crosswise dimension of the elevator being maintained at a minimum to accommodate a standard passenger automobile. This is so since extension slide 68 is of a maximum length being only slightly less than the width of the elevator and is moved crosswise of the elevator a maximum distance equal substantially to the length of the slide. Dolly 28 is thereby permitted to be a minimum length sufficient to accommodate the undercarriage of a vehicle and is moved relative to slide 68 a minimum distance which is substantially less than the distance the slide is moved relative to the elevator thereby maintaining the velocity and acceleration of dolly 28 at a minimum for a given velocity for the extension slide. This provides for minimum tension or stresses in both the cables 86 and 92 secured to dolly 28 and cables 76 and 78 secured to extension slide 68 as well as minimum stresses in the mountings for the various sheaves, the drums and other structure of the transfer mechanism. Maintaining the velocity of dolly 28 at a low value is particularly significant since the accelerative force or force necessary to accelerate and decelerate the dolly is a function of a square of the velocity ($\frac{1}{2}$ mv.$^2$) with this accelerative force being of substantial magnitude since in addition to the mass of the dolly, the mass of an automobile is involved.

Either of the drums 98 or 102 may be directly connected or otherwise driven by a motor which is preferably of the hydraulic type which such a motor 106 being diagrammatically shown in Figure 9 and directly connected with drum 84.

Fluid pressure is conveyed to the dolly for actuating the jacking mechanism which forms a part of the dolly through the flexible hose or conduit 66 with this hose being connected at one end to T fitting 108 on the dolly and disposed in generally parallel relation with cable 86 being successively trained over sheave 110 mounted on the opposite end of the extension slide and sheave 112 mounted adjacent the edge of the elevator and preferably in coaxial relation with sheave 90, with the other end of the hose being wound around drum 98 in the same direction as cable 86 so that this cable and hose are simultaneously and at the same rate wound on and unwound from the drum. The cable is thus prevented from becoming fouled during operation of the transfer mechanism and assurance provided that it will not thereby become accidentally ruptured. While sheaves 110 and 88 are diagrammatically shown spaced from one another longitudinally of and at the right end of slide 68 this is for the purpose of illustration and explanation only and in practice they would preferably be mounted coaxial of one another or in side by side relation so that they would both be positioned at the extreme end of the dolly.

Fluid pressure is supplied from a suitable source mounted on the elevator such as motor driven pump 114 which is connected with the end of hose 66 wound around drum 98 through a connection that permits the hose to rotate with the drum and the application of the fluid pressure to the jacking means is controlled in any conventional manner desired.

To illustrate the distance that the dolly may be moved from the elevator and accordingly the distance that a vehicle may be moved into one of the stalls if it is assumed that the elevator is 23' wide, with a dolly 17' long, an extension slide 22' long and with the sheaves mounted on the elevator being 6" from the edge of the elevator the dolly may be moved a maximum distance of 38' 6" from either side of the elevator, providing adequate extensions for the storing of two vehicles in tendem in stalls.

The invention in its broader aspects is not limited to the specific mechanism shown and described but departures may be made therefrom, within the scope of the accompanying claims, without departing from the principles of the invention and without sacrificing its chief advantages.

What is claimed is:

1. In an organization of the type described, an elevator having a pair of opposed sides from which material may be discharged and received, a dolly mounted on said elevator for movement transversely of said sides to and from the elevator with said dolly normally occupying a central position between said sides, means for effecting such movement including an extension slide parallel with said dolly and motor driven transversely of said sides between a position where it is centrally disposed between said sides and positions where it extends from either of said sides substantially the full length of the slide, cable means effectively interconnecting the dolly and the slide such that as the slide is moved in one direction the dolly is moved relative to said slide in the same direction, and means operative in response to operation of the motor driven slide to effectively lengthen the cable means that is effective to move the dolly during its movement from and to its central position so that it will occupy a predetermined position relative to the slide when the slide is in its extreme extended positions.

2. In an organization of the type described, an elevator having a pair of opposed sides from which material may be discharged and received, a dolly mounted on said elevator for movement transversely of said sides to and from the elevator with said dolly normally occupying a central position between said sides, means for effecting such movement including an extension slide parallel with said dolly, means for moving said slide laterally of the elevator a predetermined distance in each direction from a central position disposed between said two sides, cable means operative to move said dolly relative to said slide a predetermined distance in response to movement of said slide and in the same direction as said slide with this predetermined distance being less than said predetermined distance said slide is moved, said cable means including a cable trained over a pulley mounted adjacent one end of said slide and secured at one end to the dolly at a distance from said pulley equal to the predetermined distance the dolly is moved relative to the slide, another cable trained over a pulley adjacent the other end of the slide and similarly secured to the dolly, the other ends of said cables being wound about drum means mounted on the elevator, said drum means being interrelated with the drive for the slide and operated so that the cable that is effective to move the dolly during its movement from and to its central position is effectively lengthened and the other cable equally shortened to limit the movement of the dolly relative to the slide to said predetermined distance.

3. In storage apparatus wherein an elevator moves between two banks of vertically spaced stalls, mechanism forming a part of the elevator for transferring material to and from the opposite sides thereof from and to said stalls comprising an elongated dolly adapted to move across the elevator into said stalls and being substantially shorter than the elevator is wide, said dolly normally being centrally disposed between said opposite sides, an elongated extension slide under and in parallel relation with said dolly, said slide being substantially longer than said dolly but not greater than the width of the elevator and normally having the dolly centrally disposed intermediate its ends, motor driven means for longitudinally moving said slide in each direction to extreme positions where it extends almost its full length from said opposite sides of the elevator, a cable secured to one end of said dolly, successively trained over a pulley mounted on the slide adjacent its opposite end and a pulley mounted on the elevator adjacent the side corresponding with said one end, another cable secured to the other end of the dolly and trained over oppositely arranged pulleys, the other end of said cables being wound on drum means so that as one cable is being wound the other is being unwound, said drum means being drivingly interconnected with the driving means for the slide to unwind the cable that is effective to move the dolly when the slide is moved in either direction and at a rate such that the dolly moves the distance between the pulley on the slide over which the cable is trained and the opposite end of the dolly as the slide moves from its central to its extreme position.

4. In an automobile parking facility a multistory structure providing two banks of stalls horizontally spaced a distance slightly greater than the length of a standard passenger automobile, an elevator interposed between said banks, transfer mechanism on the elevator operative to transfer vehicles to and from each side of the elevator from and to the respective stalls and including an elongated dolly movable longitudinally across the elevator to and from said stalls and normally positioned centrally between said sides of the elevator, an elongated extension slide adjacent and parallel with said dolly, means for moving said slide laterally of the elevator a predetermined distance in each direction into said stalls from a central position intermediate said sides, said means including cable means secured to each end of the slide trained over pulleys on the elevator adjacent the side opposite the respective ends and then disposed about drum means mounted on the elevator, means for moving the dolly relative to said slide a predetermined distance in response to movement of said slide with this predetermined distance being less than the predetermined distance said slide is moved, the last named means including a cable successively trained over a pulley mounted on the slide adjacent one end and a pulley mounted on the elevator adjacent the side opposite said one end, said cable having one end secured to the dolly a distance from the pulley on the slide equal to the predetermined distance the dolly is to move relative to the slide, another cable mounted in opposite manner with respect to the last mentioned cable, the other end of these cables being wound about drum means mounted on the elevator, the several drum means being drivingly interconnected so that the drum means for the cable means connected to the slide is effective to wind and unwind the cable means at a faster rate than the drum means for the cables connected to the dolly and so that the cable that is effective to move the dolly when the slide is being moved in either direction is unwound at a rate such that as the slide is moved its predetermined distance the dolly is moved its shorter predetermined distance relative to the slide.

5. In storage apparatus the combination of an elevator, mechanism mounted thereon for transferring objects to and from the elevator over a pair of opposite sides thereof from and to storage stalls, said mechanism including an elongated dolly extending across the elevator intermediate said opposite sides and having a length substantially less than the crosswise dimension of the elevator with the dolly normally being centrally disposed between said opposite sides, means for moving said dolly to and from the elevator comprising an elongated extension slide parallel with and immediately adjacent said dolly and having pulleys mounted adjacent its ends, said slide being centrally disposed with relation to the dolly when the dolly is positioned centrally between said opposite sides of the elevator and with the slide being substantially longer than the dolly and generally corresponding with but not greater than the crosswise dimension of the elevator, means for longitudinally moving the slide in opposite directions to and from extreme positions where it extends substantially its full length from said opposite sides of the elevator including cable means secured to the ends of the slide, trained over pulleys mounted on the elevator adjacent opposite ends of the slide and wound on motor driven drum means mounted on the elevator so that through operation of the drum means the slide may be moved in either direction, a cable secured to one end of the dolly, successively trained over the pulley on the opposite end of the slide and a pulley mounted on the elevator adjacent the side thereof corresponding with said one end of the dolly, another cable secured to the other end of the dolly and successively trained over oppositely arranged pulleys, the other end of these two cables being oppositely wound about a motor driven drum mounted on the dolly, said drum means and said drum being drivingly interconnected so that as the cable means is being wound on the drum means to move the slide the cable connected to the dolly and trained over the forward end of the slide is being unwound at a rate such that as the slide moves to and from its central and extreme position the dolly moves relative to the slide and in the same direction as the slide a distance substantially equal to the distance between the end of the dolly and the pulley mounted on the opposite end of the slide and which is substantially less than the distance moved by the slide.

6. In an automobile parking facility a multistorage structure providing two horizontally spaced banks of parking stalls, an elevator interposed between said banks of stalls, transfer mechanism carried by the elevator and operative to transfer vehicles to and from each side of the elevator from and to the respective stalls and including an elongated dolly movable across the elevator into the stalls on opposite sides thereof, said dolly normally being centrally disposed intermediate the sides of the elevator and having its ends spaced well inwardly from said sides, a jack frame forming part of said dolly, fluid pressure operated jack means operative to raise said jack frame with respect to the remainder of the dolly, an elongated extension slide disposed beneath and slidably carried by said dolly in parallel relation therewith, said slide being substantially longer than said dolly and of a length substantially equal to but not greater than the width of the elevator and normally having said dolly centered with respect thereto, means operative to longitudinally move said slide to and from extreme positions where it extends substantially its full length from either side of the elevator, a cable secured at one end to one end of said dolly and successively trained over a pulley mounted on the slide adjacent its opposite end and a pulley mounted on the elevator adjacent the side corresponding with said one end, another cable secured at one end to the other end of the dolly and trained over oppositely arranged pulleys, the other end of said cables being wound on drum means in opposite rotative directions, a source of fluid pressure on the elevator, a flexible hose operative to convey said fluid pressure from said source to the jack means, said hose being connected at one end to one end of said dolly and successively trained over a pulley mounted on the slide adjacent its opposite end and a pulley mounted on the elevator adjacent the side corresponding with said one end of the dolly, the other end of said hose being wound on said drum means in the same manner as the cable it parallels, said drum means being driven by the means for longitudinally moving the slide to unwind the cable that is effective to move the dolly when the slide is moved in either direction at a rate such that the dolly moves outwardly of the slide the distance between the pulley on the slide over which the cable is trained and the opposite end of the dolly as the slide moves from its central to its extreme position.

7. In an automobile parking facility a multistory structure providing two banks of stalls horizontally spaced a distance slightly greater than the length of a standard passenger automobile, an elevator interposed between said banks, transfer mechanism on the elevator operative to transfer vehicles to and from each side of the elevator from and to the respective stalls and including an elongated dolly movable longitudinally across the elevator to and from said stalls and normally positioned centrally between said sides, said dolly including a jack frame and fluid pressure operated jacking means for raising said frame relative to the remainder of the dolly, an elongated extension slide adjacent and parallel with said dolly, means for moving said slide laterally of the elevator a predetermined distance in each direction into said stalls from a central position intermediate said sides, said means including cable means secured to each end of the slide trained over pulleys on the elevator adjacent the side opposite the respective ends and then disposed about drum means mounted on the elevator, means for moving the dolly relative to said slide a predetermined distance in response to movement of said slide with this predetermined distance being less than the predetermined distance said slide is moved, the last named means including a cable successively trained over a pulley mounted on the slide adjacent one end and a pulley mounted on the elevator adjacent the side opposite said one end, said cable having one end secured to the dolly a distance from the pulley on the slide equal to the predetermined distance the dolly is to move relative to the slide, another cable mounted in opposite manner with respect to the last mentioned cable, the other end of these cables being wound about drum means mounted on the elevator, a source of fluid pressure mounted on the elevator, a flexible hose operative to convey this fluid pressure to said dolly for operation of said jacks, said hose being mounted in generally parallel and similar relation to one of said cables secured to the dolly being successively trained over a pulley on one end of the extension slide and a pulley mounted on the elevator adjacent the side opposite said one end, one end of said hose being secured to the dolly a distance from the pulley at least as great as the predetermined distance the dolly is to move relative to slide with the other end of the hose wound about drum means operated simultaneously with the drum means about which the cable which it parallels is wound so that this cable and the hose are simultaneously wound and unwound at the same rate, the several drum means for the cable means being drivingly interconnected so that the drum means for the cable means connected to the slide is effective to wind and unwind this cable means at a faster rate than the drum means for the cables connected to the dolly and so that the cable that is effective to move the dolly when the slide is being moved in either direction is unwound at a rate such that as the slide is moved its predetermined distance the dolly is moved its shorter predetermined distance relative to the slide.

8. In an automobile parking and storage organization wherein an elevator vertically lifts the vehicles for deposit on and removal from the floors of a multistory structure each of which floors has stalls on opposite sides of the elevator and of a suitable size to receive two vehicles in tandem from the elevator with the width of the elevator being only slightly greater than the length of a standard passenger car, the combination of transfer mechanism for transferring cars to and from the elevator and stalls comprising a dolly disposed crosswise of the elevator intermediate two vertically disposed banks of stalls for movement from the elevator into said stalls and back to the elevator and being of a length substantially less than the width of the elevator and only of sufficient length to accommodate the undercarriage of a standard passenger automobile, said dolly including a jack frame and fluid pressure operated jacking means for raising said frame relative to the remainder of the dolly, an extension slide juxtaposed to said dolly in parallel relation therewith and extending substantially across the entire width of the elevator and being substantially longer than said dolly with said slide being centrally disposed in relation to the dolly when the dolly is positioned centrally between opposite sides of the elevator, means for moving said slide laterally of the elevator to each side thereof a distance into the stalls substantially equal to the length of the slide and including cable means secured to the ends of the slide, trained over pulleys mounted on the elevator adjacent opposite ends of the slide and wound around a first drum on the elevator so that as the drum is rotated in opposite directions the slide is moved in opposite directions, a cable secured to one end of the dolly, successively trained over a pulley on the opposite ends of the slide and a pulley mounted on the elevator adjacent the side thereof corresponding with said one end of the dolly and juxtaposed with one of the pulleys associated with the cable means connected to the extension slide, another cable and a flexible hose in generally parallel relation secured to the other end of the dolly and successively trained over pulleys oppositely arranged with respect to those associated with the cable secured to said one of the dolly, a second drum on the elevator about which the other end of these two cables and the hose are wound with the cables being wound in opposite directions and with the hose in the same direction as the cable which it parallels so that as the second drum rotates in one direction the one cable will be wound on the drum and the other cable and the hose will be unwound therefrom with the opposite result occurring when the direction of rotation of the drum is reversed, a source of fluid pressure on the elevator operatively connected with the jacks on the dolly through said flexible hose, said first and second drum being drivingly interconnected so that as the cable means is being wound on the first drum to move the slide in either direction the cable connected to the dolly and trained over the forward end of the slide is unwound at a rate such that as the slide moves to and from its central and extreme positions the dolly moves relative to the slide and in the same direction as the slide a distance substantially equal to the distance between the end of the dolly and the pulley mounted on the opposite end of the slide and which is substantially less than the distance moved by the slide.

References Cited in the file of this patent

UNITED STATES PATENTS

| | | |
|---|---|---|
| 2,073,721 | Wheelock | Mar. 16, 1937 |
| 2,626,065 | Sanders et al. | Jan. 20, 1953 |